United States Patent Office 3,133,971
Patented May 19, 1964

3,133,971
PROCESS FOR PRODUCING SULFONIUM COMPOUNDS
Warren S. MacGregor, Camas, Wash., assignor to Crown Zellerbach Corporation, San Francisco, Calif., a corporation of Nevada
No Drawing. Filed Apr. 9, 1962, Ser. No. 185,848
20 Claims. (Cl. 260—607)

This invention relates to a process for producing sulfonium compounds and more particularly relates to a process of producing hydroxyaryl sulfonium chlorides.

The hydroxyaryl sulfonium chlorides are useful in many applications, for example as surface active agents, biological toxicants, and as raw materials in the synthesis of organic derivatives such as alkylthio phenols. However, their use in these various applications has been limited by their relatively high cost.

It is the general object of this invention to provide a process for preparing sulfonium compounds, particularly hydroxyaryl sulfonium chlorides, in substantial yields from inexpensive starting materials by an economical procedure.

It is another important object of the present invention to provide a process for making dialkyl hydroxyaryl sulfonium chlorides, which process may easily be conducted on a commercial scale.

According to this invention, hydroxyaryl sulfonium chlorides may be produced efficiently and in relatively high yields by preparing a liquid mixture comprising an organic thioether and a phenol and reacting the resulting mixture with chlorine under carefully controlled conditions for a time sufficient to form a substantial amount of a corresponding hydroxyaryl sulfonium chloride. Specifically, dimethyl hydroxyaryl sulfonium chlorides may be prepared readily and economically by reacting a mixture of dimethyl sulfide and phenol with chlorine gas.

When these chemical reagents are reacted with each other in liquid medium at a relatively low temperature, the corresponding hydroxyaryl sulfonium chloride is formed in accordance with the reaction which may be illustrated as follows:

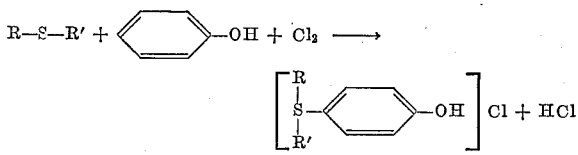

In the above formulas, R and R' are represented by an alkyl, aryl, aralkyl or alkaryl radical and substituted derivatives thereof.

Considering the foregoing in greater detail, suitable thioethers for use in the herein described process broadly comprise organic sulfides having the general formula indicated hereinabove, preferably those containing up to 20 carbon atoms and having at least one methylene group attached to the sulfur atom. Illustrative of suitable alkyl radicals are: methyl, ethyl, butyl, octyl, dodecyl and 2-chloroethyl; of aryl radicals are: phenyl, naphthyl, halophenyl and carbethoxyphenyl; of aralkyl are: benzyl, phenylethyl and nitrophenylethyl; and alkaryl are: methylphenyl, ethylphenyl, dimethylphenyl, butylphenyl, and ethylbromophenyl.

The preferred thioether is dimethyl sulfide which may be produced commercially in large quantities from alkaline spent liquor resulting from pulping of lignocellulose.

In general, the phenols which are suitable for use in the herein described process comprise phenols having at least one unsubstituted reactive position in the aromatic ring. Illustrative of suitable phenols are: monohydroxybenzene, cresols, xylenols, butylphenols, octylphenols, nonylphenols, tridecylphenols, naphthols, mono- and dihalophenols, guaiacol, catechol, resorcinol, and the like; the preferred phenols are: monohydroxybenzene and m-cresol.

In addition to the three essential reactants, i.e. an organic thioether, a phenol, and chlorine, a diluent may optionally be included in order to increase the efficiency of the reaction and to insure an adequate heat transfer. If a diluent is employed, it should either be inert to the three reactants and to the resulting reaction products or be characterized by a substantially lower reaction rate with chlorine than the thioether and the phenol. Illustrative of suitable diluents are hydrogen chloride; concentrated hydrochloric acid; phosphoric acid; alkyl halides, such as methyl chloride; alkyl ethers, such as ethyl ether; alkanes, such as pentane and heptane; aromatic hydrocarbons, such as toluene and xylene; and other chemicals which are liquid during the reaction in accordance with the present procedure. A liquid dialkyl sulfide or a phenol may also be employed as a diluent, in which case the amount thereof should be in excess of that required for the reaction.

Although water and aliphatic alcohols per se are not suitable as diluents, they may be employed if saturated with hydrogen chloride gas.

In general, the thioether, the phenol and the chlorine are reacted in approximately stoichiometric amounts, i.e. equivalent amounts required for formation of the corresponding sulfonium chloride. In order to avoid undesirable side reactions, chlorine should not be employed in molar excess of either the thioether or phenol. Accordingly, the molar ratio of the thioether or phenol to chlorine may be as high as 3:1 respectively. Higher ratios of the thioether or the phenol to chlorine may be employed, although no benefit results therefrom.

The process of this invention is carried out by first providing a liquid mixture of a thioether and of a phenol and then adding to the resulting mixture, with agitation, chlorine gas in an amount required for the reaction with the thioether and the phenol. The reaction may be conducted in a suitable reaction vessel preferably provided with agitating means and with means for cooling the reactants during the reaction period. The mixture then is allowed to react at a low temperature in the range of between about −50° C. and about 10° C., preferably between about −25° C. and about −10° C. for a time sufficient to produce a substantial amount of the sulfonium chloride product. In general, this may require from about 15 minutes to 48 hours, however in a typical instance the reaction time from 1 to 5 hours usually is sufficient to complete formation of the sulfonium compound. As mentioned hereinabove, the efficiency of the reaction may be enhanced if suitable agitation of the liquid reaction mixture is provided to insure a homogeneous mixture of the reactants and to avoid localized overheating during addition of chlorine gas.

The presently described process will be more fully understood from the following detailed examples. It should be understood that these examples merely illustrate preferred embodiments of the invention and do not limit the scope thereof.

*Example 1*

141 grams of monohydroxy benzene (1.5 moles) and 124 grams of dimethyl sulfide (2 moles) are admixed in a 3-neck flask fitted with a sealed stirrer, thermometer, a gas inlet tube extending as far as possible down into the flask, and a vent for exit gas. The flask is cooled by being placed in a Dry Ice-acetone bath. The liquid mixture is cooled to −20° C. and gaseous chlorine is added to the liquid mixture, while stirring, in an amount of 114 grams (1.6 moles) over a period of time of 55 minutes. During addition of chlorine, the temperature of the reaction mixture is maintained between −20° C. and −23° C. After addition of chlorine is complete, the mixture is allowed to stand for 4 hours after which time the reaction is substantially complete. The resulting reaction product is filtered, washed with acetone, and dried. The total yield of the reaction product i.e. 4-hydroxyphenyl dimethyl sulfonium chloride in the form of white crystals is 178.5 grams, corresponding to a 62.7% yield, based on theoretical.

*Example 2*

The procedure of Example 1 is repeated, except that the temperature of the reaction mixture during the chlorine addition is about 0° C. A yield of 78 grams of 4-hydroxyphenyl dimethyl sulfonium chloride corresponding to 41% of theoretical is obtained.

*Example 3*

A liquid mixture is prepared by admixing 94 grams of monohydroxy benzene (1 mole), 75 grams of dimethyl sulfide (1.2 moles) and 100 grams of heptane as a diluent. 78 grams of chlorine (1.1 moles) is added to the mixture while maintaining its temperature at between −10° C. and −15° C. over a period of 40 minutes. The reaction mixture is allowed to stand for 6 hours. The yield of 4-hydroxyphenyl dimethyl sulfonium chloride is 112 grams (59% of theoretical).

*Example 4*

The procedure of Example 1 is substantially followed except that the liquid mixture of dimethyl sulfide and monohydroxy benzene is saturated with hydrogen chloride gas while maintaining the temperature at 0° C. The yield of 4-hydroxyphenyl dimethyl sulfonium chloride is 135.5 grams (71% of theoretical).

*Example 5*

The procedure of Example 3 is followed except that concentrated hydrochloric acid (37% HCl) is employed instead of heptane. The amount of chlorine added to the mixture is 85 grams (1.2 moles) and the period of time for its addition is 50 minutes. After the reaction is complete, the entire reaction mixture is poured into 1 liter of acetone. The yield of white crystalline 4-hydroxyphenyl dimethyl sulfonium chloride is 125.5 grams (66% of theoretical).

*Example 6*

A liquid mixture is prepared by admixing 108 grams of m-cresol (1 mole), 75 grams of dimethyl sulfide (1.2 moles) and 75 grams of concentrated hydrochloric acid as a diluent. The mixture then is saturated with hydrogen chloride gas at −10° C. and 85 grams of chlorine (1.2 moles) is introduced therein over a period of 40 minutes while the temperature of the reaction mixture is maintained between −10° C. and −15° C. An additional 25 grams of concentrated hydrochloric acid is added toward the end of the chlorine addition period to facilitate stirring of the reaction mixture. After standing for a period of 2 hours, the mixture is poured into 1.5 liter of acetone. The yield of white crystalline 4-hydroxy-2-methylphenyl dimethyl sulfonium chloride is 135.2 grams (65% of theoretical).

*Example 7*

The procedure of Example 6 is followed except that p-cresol is used instead of m-cresol. The yield of the resulting 2-hydroxy-5-methylphenyl dimethyl sulfonium chloride product is 121 grams (59% of theoretical).

*Example 8*

108 grams of m-cresol (1 mole), 78 grams of dimethyl sulfide (1.25 mole) and 108 grams of p-cresol, used as a diluent, is admixed and the mixture is saturated with hydrogen chloride gas at a temperature of −15° C. 88.6 grams of chlorine (1.25 moles) then is added to the mixture over a period of 22 minutes while maintaining the temperature of the reaction mixture at between −16° C. and −20° C. The mixture is allowed to stand for 2 hours and then is evacuated to a pressure of 15 mm. of mercury, while heating to 40° C. to remove hydrogen chloride. The resultant mixture is poured into one liter of acetone to separate the white crystalline product, i.e., 4-hydroxy-2-methylphenyl dimethyl sulfonium chloride, substantially free of the 2-hydroxy-5 methyl isomer. The yield of the reaction product is 119 grams (58% of theoretical).

*Example 9*

The procedure of Example 3 is repeated using dioctyl sulfide instead of dimethyl sulfide. The yield of the resulting 4-hydroxyphenyl dioctyl sulfonium chloride is 174 grams, corresponding to 45% of theoretical.

*Example 10*

The procedure of Example 3 again is followed using methyl phenyl sulfide instead of dimethyl sulfide. The yield of the resulting 4-hydroxyphenyl methyl phenyl sulfonium chloride is 129 grams, corresponding to 51% of theoretical.

*Example 11*

The procedure of Example 8 is repeated using a continuous reactor with the chlorine being introduced into the stream of cooled reactants in a tubular reactor at three points along its length to insure adequate control of reaction temperature. The mixture is then fed into an enlarged zone, held therein for 2 hours in order to complete the reaction, and transferred to a suitable vessel to remove hydrogen chloride. The yield of the resultant reaction product is the same as in Example 8.

It will be apparent from the foregoing disclosure that the process of the present invention offers several significant advantages which greatly enhance the economic aspects of manufacturing hydroxyaryl sulfonium chlorides on a commercial scale.

It is to be understood that changes and modifications may be made in regard to specific details of this invention which are intended to be included within the scope of the appended claims.

I claim:

1. A process for producing a sulfonium compound which comprises preparing a liquid mixture comprising an organic sulfide of the formula R—S—R' containing at least one methylene group attached to the sulfur atom, wherein the sulfur atom alone is reactive with a phenol, and a phenol containing at least one unsubstituted reactive position in the aromatic ring and being devoid of substituents reactive toward the sulfur atom, and reacting the liquid mixture with chlorine for a time sufficient to form a substantial amount of a corresponding hydroxyphenyl sulfonium chloride.

2. The process of claim 1 wherein the sulfide is a dialkyl sulfide containing up to 20 carbon atoms.

3. The process of claim 1 wherein the sulfide is dimethyl sulfide.

4. The process of claim 1 wherein the phenol is monohydroxybenzene.

5. The process of claim 1 wherein the phenol is m-cresol.

6. The process of claim 1 wherein the liquid mixture includes a diluent selected from the group consisting of (a) an inert diluent, (b) excess sulfide reactant, and (c) excess phenol reactant.

7. The process of claim 1 wherein the liquid mixture includes a diluent which is inert to the reactants and the reaction products.

8. The process of claim 7 wherein the diluent comprises hydrogen chloride.

9. The process of claim 1 wherein the temperature of the reaction is maintained between about −50° C. and about 10° C.

10. The process of claim 1 wherein the temperature of the reaction is maintained between about −25° C. and about −10° C.

11. The process of claim 1 wherein the sulfide, the phenol and the chlorine are reacted in approximately stoichiometric amounts.

12. The process of claim 1 wherein the respective molar ratio of the sulfide and of the phenol to chlorine is in excess of 1:1.

13. The process for producing a sulfonium compound which comprises providing a liquid mixture comprising essentially a dialkyl sulfide containing up to 20 carbon atoms and a phenol containing at least one unsubstituted reactive position in the aromatic ring and being devoid of substituents reactive toward the sulfur atom, adding with agitation chlorine to said mixture and reacting the resultant mixture for a time sufficient to form a substantial amount of a dialkyl hydroxyaryl sulfonium chloride, the temperature of the mixture during the reaction being maintained between about −50° C. and about 10° C., and separating the sulfonium chloride thus formed from the reaction mixture.

14. The process of claim 13 wherein the sulfide is dimethyl sulfide.

15. The process of claim 13 wherein the respective molar ratio of the dialkyl sulfide and of the phenol to chlorine is in excess of 1:1.

16. The process of claim 13 wherein the mixture includes a diluent selected from the group consisting of (a) an inert diluent, (b) excess sulfide reactant, and (c) excess phenol reactant.

17. The process of claim 13 wherein the reaction is conducted at a temperature between −25° C. and −10° C.

18. The process of claim 16 wherein the diluent comprises hydrogen chloride.

19. The process for producing a sulfonium compound which comprises preparing a liquid mixture comprising essentially dimethyl sulfide and a phenol selected from the group consisting of monohydroxybenzene and m-cresol, thereafter adding with agitation chlorine to said mixture in an amount sufficient to provide a respective molar ratio of the dimethyl sulfide and of the phenol to chlorine of at least 1:1, reacting the resultant mixture at a temperature between −25° C. and −10° C. for a time sufficient to form a substantial amount of the corresponding hydroxyphenyl dimethyl sulfonium chloride, and separating the sulfonium chloride thus formed from the reaction mixture.

20. The process of claim 19 wherein the mixture includes concentrated hydrochloric acid as a diluent.

No references cited.